(12) United States Patent
Nakadaira (10) Patent No.: US 12,149,203 B2
(45) Date of Patent: Nov. 19, 2024

(54) ENERGY HARVESTING MODULE AND METHOD OF PRODUCING SAME

(71) Applicant: ZEON CORPORATION, Tokyo (JP)

(72) Inventor: Tadakatsu Nakadaira, Tokyo (JP)

(73) Assignee: ZEON CORPROATION, Tokyo (JP)

( * ) Notice: Subject to any disclaimer, the term of this patent is extended or adjusted under 35 U.S.C. 154(b) by 251 days.

(21) Appl. No.: 18/000,289

(22) PCT Filed: Jun. 22, 2021

(86) PCT No.: PCT/JP2021/023685
§ 371 (c)(1),
(2) Date: Nov. 30, 2022

(87) PCT Pub. No.: WO2022/019037
PCT Pub. Date: Jan. 27, 2022

(65) Prior Publication Data
US 2023/0223894 A1    Jul. 13, 2023

(30) Foreign Application Priority Data
Jul. 22, 2020   (JP) ................................. 2020-125750

(51) Int. Cl.
   *H02S 30/10*   (2014.01)
   *H02S 20/10*   (2014.01)
   *H02S 20/20*   (2014.01)

(52) U.S. Cl.
   CPC .............. *H02S 30/10* (2014.12); *H02S 20/10* (2014.12); *H02S 20/20* (2014.12)

(58) Field of Classification Search
   CPC ........... H02S 20/10; H02S 20/20; H02S 30/10
   See application file for complete search history.

(56) References Cited

U.S. PATENT DOCUMENTS

| | | | |
|---|---|---|---|
| 9,675,007 B2 * | 6/2017 | Schrattenecker | ...... A01D 45/00 |
| 10,151,525 B2 * | 12/2018 | Shrader | .................... F25D 23/04 |
| 2014/0060625 A1 * | 3/2014 | Beuke | ................. H01L 31/0203 |
| | | | 136/251 |

(Continued)

FOREIGN PATENT DOCUMENTS

| CN | 209267517 U | 8/2019 |
|---|---|---|
| JP | 2012195483 A | 10/2012 |

OTHER PUBLICATIONS

Jan. 24, 2023, International Preliminary Report on Patentability issued in the International Patent Application No. PCT/JP2021/023685.

(Continued)

*Primary Examiner* — Gary A Nash
(74) *Attorney, Agent, or Firm* — KENJA IP LAW PC (57) ABSTRACT

An energy harvesting module (1) includes: an energy harvesting element (2) including a first side (2a); and a frame (4). At the first side (2a), the frame (4) has an alternating arrangement structure (7) in which, along an outer edge of the energy harvesting element (2), there is alternating arrangement of: an outward second perimeter wall structure (7a) configured such that a second perimeter wall (6b) overlaps with a first perimeter wall (5b) from an outward radial direction and is snap-fitted therewith; and an inward second perimeter wall structure (7b) configured such that the second perimeter wall (6b) overlaps with the first perimeter wall (5b) from an inward radial direction and is snap-fitted therewith.

5 Claims, 4 Drawing Sheets (56) References Cited

U.S. PATENT DOCUMENTS

2014/0325948 A1* 11/2014 Schrattenecker .... A01D 41/147
  56/2
2018/0076759 A1*  3/2018 Yoshida ................. H02S 30/20

OTHER PUBLICATIONS

Jul. 11, 2024, the Extended European Search Report issued by the European Patent Office in the corresponding European Patent Application No. 21845763.8.

* cited by examiner

ENERGY HARVESTING MODULE AND METHOD OF PRODUCING SAME

TECHNICAL FIELD

The present disclosure relates to an energy harvesting module and a method of producing the same.

BACKGROUND

A known energy harvesting module includes an energy harvesting element, such as a solar cell element, and a frame that is attached to an outer edge of the energy harvesting element and that is formed of a plurality of partial frames. For example, Patent Literature (PTL) 1 discloses an energy harvesting module in which a frame is formed of partial frames attached along four sides of a solar cell element having a rectangular flat plate shape.

CITATION LIST

Patent Literature

PTL 1: JP2012-195483A

SUMMARY

Technical Problem

However, an energy harvesting module such as disclosed in PTL 1 has a complicated production process because it is necessary to link adjacent partial frames to each other through a fastening device such as a screw.

Accordingly, an object of the present disclosure is to provide an energy harvesting module and method of producing the same that enable production process simplification.

Solution to Problem

An energy harvesting module that is one aspect of the present disclosure comprises: an energy harvesting element that is plate shaped and includes a first principal surface, a second principal surface located at a rear side of the first principal surface, and a first side forming corners at both ends thereof; and a frame that includes a first partial frame configured to support an outer edge of the first principal surface and a second partial frame configured to support an outer edge of the second principal surface, wherein the first partial frame includes a first perimeter wall that extends along an outer edge of the energy harvesting element and also extends from a side corresponding to the first principal surface toward a side corresponding to the second principal surface, the second partial frame includes a second perimeter wall configured to overlap with the first perimeter wall in a radial direction, and, at the first side, the frame has an alternating arrangement structure in which, along the outer edge of the energy harvesting element, there is alternating arrangement of: an outward second perimeter wall structure configured such that the second perimeter wall overlaps with the first perimeter wall from an outward radial direction and is snap-fitted therewith; and an inward second perimeter wall structure configured such that the second perimeter wall overlaps with the first perimeter wall from an inward radial direction and is snap-fitted therewith. Through a configuration such as set forth above, it is possible to attach the first partial frame and the second partial frame to the outer edge of the energy harvesting element by snap-fitting the first perimeter wall and the second perimeter wall with each other in the alternating arrangement structure. Consequently, it is possible to simplify a production process of the energy harvesting module. Moreover, as a result of elastic deformation of the first partial frame in an outward radial direction relative to the second partial frame being inhibited by the outward second perimeter wall structure and elastic deformation of the first partial frame in an inward radial direction relative to the second partial frame being inhibited by the inward second perimeter wall structure at the first side, it is possible to ensure good fitting strength of the first frame and the second partial frame at the first side.

In one embodiment of the present disclosure, the first partial frame is configured to support the outer edge of the first principal surface at the first side, and the second partial frame is configured to support the outer edge of the second principal surface at the first side. Through a configuration such as set forth above, it is possible to strongly support the energy harvesting element through the frame at the first side.

In one embodiment of the present disclosure, the first partial frame and the second partial frame are configured to act in conjunction to sandwich the energy harvesting element at the first side. Through a configuration such as set forth above, it is possible to even more strongly support the energy harvesting element through the frame at the first side.

In one embodiment of the present disclosure, the energy harvesting element includes a second side and a third side that are located adjacently to the first side and a fourth side that is located opposite the first side, and has a rectangular plate shape, and the frame has the alternating arrangement structure at each of the second side, the third side, and the fourth side. Through a configuration such as set forth above, it is possible to strongly support the energy harvesting element through the frame.

A method of producing an energy harvesting module that is one aspect of the present disclosure is a method of producing an energy harvesting module that includes: an energy harvesting element that is plate shaped and includes a first principal surface, a second principal surface located at a rear side of the first principal surface, and a first side forming corners at both ends thereof; and a frame that includes a first partial frame configured to support an outer edge of the first principal surface and a second partial frame configured to support an outer edge of the second principal surface, wherein the first partial frame includes a first perimeter wall that extends along an outer edge of the energy harvesting element and also extends from a side corresponding to the first principal surface toward a side corresponding to the second principal surface, the second partial frame includes a second perimeter wall configured to overlap with the first perimeter wall in a radial direction, and, at the first side, the frame has an alternating arrangement structure in which, along the outer edge of the energy harvesting element, there is alternating arrangement of: an outward second perimeter wall structure configured such that the second perimeter wall overlaps with the first perimeter wall from an outward radial direction and is snap-fitted therewith; and an inward second perimeter wall structure configured such that the second perimeter wall overlaps with the first perimeter wall from an inward radial direction and is snap-fitted therewith, the method comprising: a frame attachment step of attaching the first partial frame and the second partial frame to the outer edge of the energy harvesting element by snap-fitting the first perimeter wall and the second perimeter wall with each other in the alternating arrangement structure. Through a configuration such as set forth above, it is possible to simplify a production process of the energy harvesting module through the frame attachment step in which snap-fitting is adopted. Moreover, the alternating arrangement structure makes it possible to ensure good fitting strength of the first frame and the second partial frame at the first side.

Advantageous Effect

According to the present disclosure, it is possible to provide an energy harvesting module and method of producing the same that enable production process simplification.

DETAILED DESCRIPTION

The following provides a detailed illustrative description of an energy harvesting module 1 and method of producing the same according to one embodiment of the present disclosure with reference to the drawings.

Figure 1:
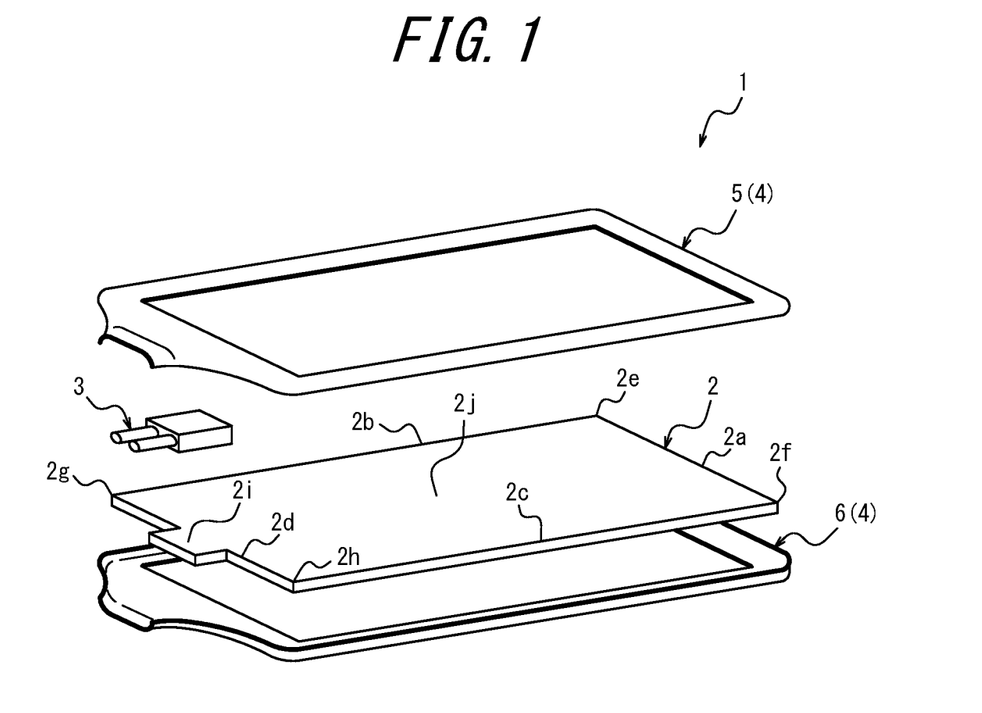
FIG. 1 is a perspective view illustrating an energy harvesting module according to one embodiment of the present disclosure in a pre-assembly state.
Figure 2:
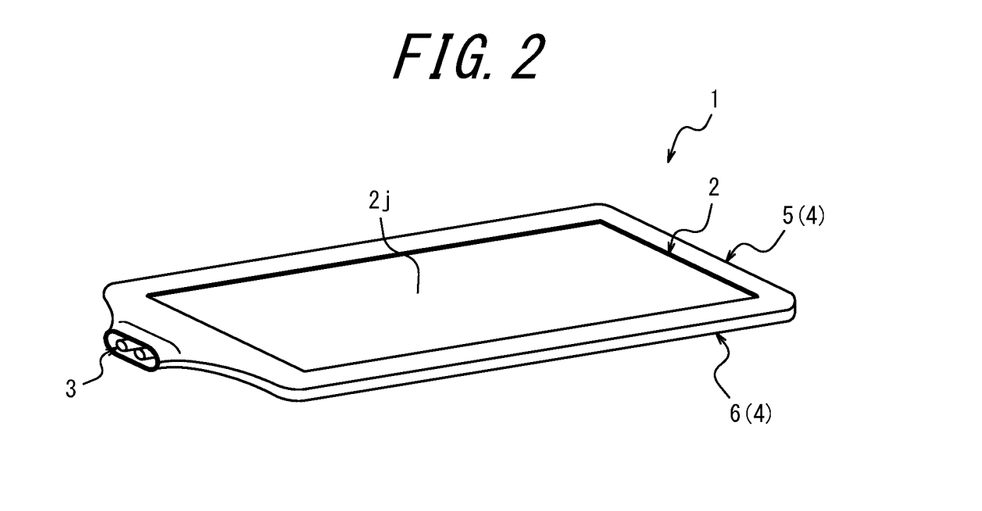
FIG. 2 is a perspective view illustrating the energy harvesting module illustrated in FIG. 1 in a post-assembly state.

The energy harvesting module 1 of the present embodiment illustrated in FIGS. 1 and 2 includes an energy harvesting element 2, a terminal member 3, and a frame 4. The frame 4 includes a first partial frame 5 and a second partial frame 6. The energy harvesting element 2 is a solar cell element that is configured to convert light energy such as sunlight or indoor light to electrical energy. Note that the energy harvesting element 2 is not limited to a solar cell element and may, for example, be a thermoelectric conversion element that is configured to convert thermal energy such as geothermal energy to electrical energy.

The energy harvesting element 2 has a rectangular flat plate shape and includes a first side 2a, a second side 2b, a third side 2c, and a fourth side 2d at an outer edge of the energy harvesting element 2. A first corner 2e is formed by the first side 2a and the second side 2b, a second corner 2f is formed by the first side 2a and the third side 2c, a third corner 2g is formed by the second side 2b and the fourth side 2d, and a fourth corner 2h is formed by the third side 2c and the fourth side 2d. The second side 2b and the third side 2c are both located adjacently to the first side 2a, whereas the fourth side 2d is located opposite the first side 2a. A terminal protrusion 2i that protrudes in an outward radial direction is provided at the fourth side 2d. The first side 2a, the second side 2b, and the third side 2c each have a linear shape.

The energy harvesting element 2 includes a first principal surface 2j and a second principal surface 2k located at a rear side of the first principal surface 2j. Note that in the present embodiment, in order to facilitate description, a direction perpendicular to the energy harvesting element 2 (i.e., a thickness direction of the energy harvesting element 2) is referred to as an up/down direction, a direction from a side corresponding to the second principal surface 2k toward a side corresponding to the first principal surface 2j is referred to as upward, a direction from a side corresponding to the first principal surface 2j toward a side corresponding to the second principal surface 2k is referred to as downward, a direction from inside to outside of the energy harvesting element 2 in a plane perpendicular to an up/down direction is referred to as an outward radial direction, a direction from outside to inside of the energy harvesting element 2 in a plane perpendicular to an up/down direction is referred to as an inward radial direction, and a direction around the energy harvesting element 2 in a plane perpendicular to an up/down direction is referred to as a perimeter direction.

The terminal member 3 includes a terminal 3a for externally withdrawing electrical power generated by the energy harvesting element 2. The terminal member 3 is arranged on the terminal protrusion 2i and is configured such as to be held by the frame 4 in a state in which the frame 4 is attached to the outer edge of the energy harvesting element 2.

The outer edge of the energy harvesting element 2 is covered by the frame 4 along the entire perimeter thereof and is thereby protected. The frame 4 is formed of a first partial frame 5 and a second partial frame 6 that are two partial frames configured to snap-fit with each other in an up/down direction (i.e., configured such that step shaped portions of the partial frames move over each other in the up/down direction through elastic deformation to thereby fit together).

The first partial frame 5 and the second partial frame 6 are each made of a synthetic resin such as polycarbonate resin. However, it should be noted that the first partial frame 5 and the second partial frame 6 are not limited to being made of a synthetic resin. Moreover, the first partial frame 5 and the second partial frame 6 are each formed as a single body through injection molding. However, it should be noted that the first partial frame 5 and the second partial frame 6 may each be formed by assembling a plurality of members using a fastening device such as a screw or through adhesion, fitting, or the like. The thickness of the frame 4 in an up/down direction when in an assembled state can be approximately 3 mm, for example.

As illustrated in FIGS. 3 to 6, the first partial frame 5 includes a first support surface 5a that is configured to support an outer edge of the first principal surface 2j at the first side 2a. The first partial frame 5 also includes a first perimeter wall 5b that extends along the first side 2a and also extends in an up/down direction from a side corresponding to the first principal surface 2j toward a side corresponding to the second principal surface 2k. In other words, the first perimeter wall 5b is configured as a wall that is perpendicular to a radial direction. The first partial frame 5 includes a first principal wall 5c having the first support surface 5a on a lower surface thereof. The first perimeter wall 5b extends downward from the first principal wall 5c in an up/down direction.

The second partial frame 6 includes a second support surface 6a that is configured to support an outer edge of the second principal surface 2k at the first side 2a. The second partial frame 6 also includes a second perimeter wall 6b that extends along the first side 2a and also extends in an up/down direction from a side corresponding to the second principal surface 2k toward a side corresponding to the first principal surface 2j. In other words, the second perimeter wall 6b is configured as a wall that is perpendicular to a radial direction. The second perimeter wall 6b is configured to overlap with the first perimeter wall 5b in a radial direction. The second partial frame 6 includes a second principal wall 6c having the second support surface 6a at an upper surface thereof. The second perimeter wall 6b extends upward from the second principal wall 6c in an up/down direction.

A configuration in which the first support surface 5a of the first partial frame 5 and the second support surface 6a of the second partial frame 6 act in conjunction to sandwich the energy harvesting element 2 at the first side 2a is preferable in terms of strongly supporting the energy harvesting element 2 through the frame 4 at the first side 2a.

Figure 3:
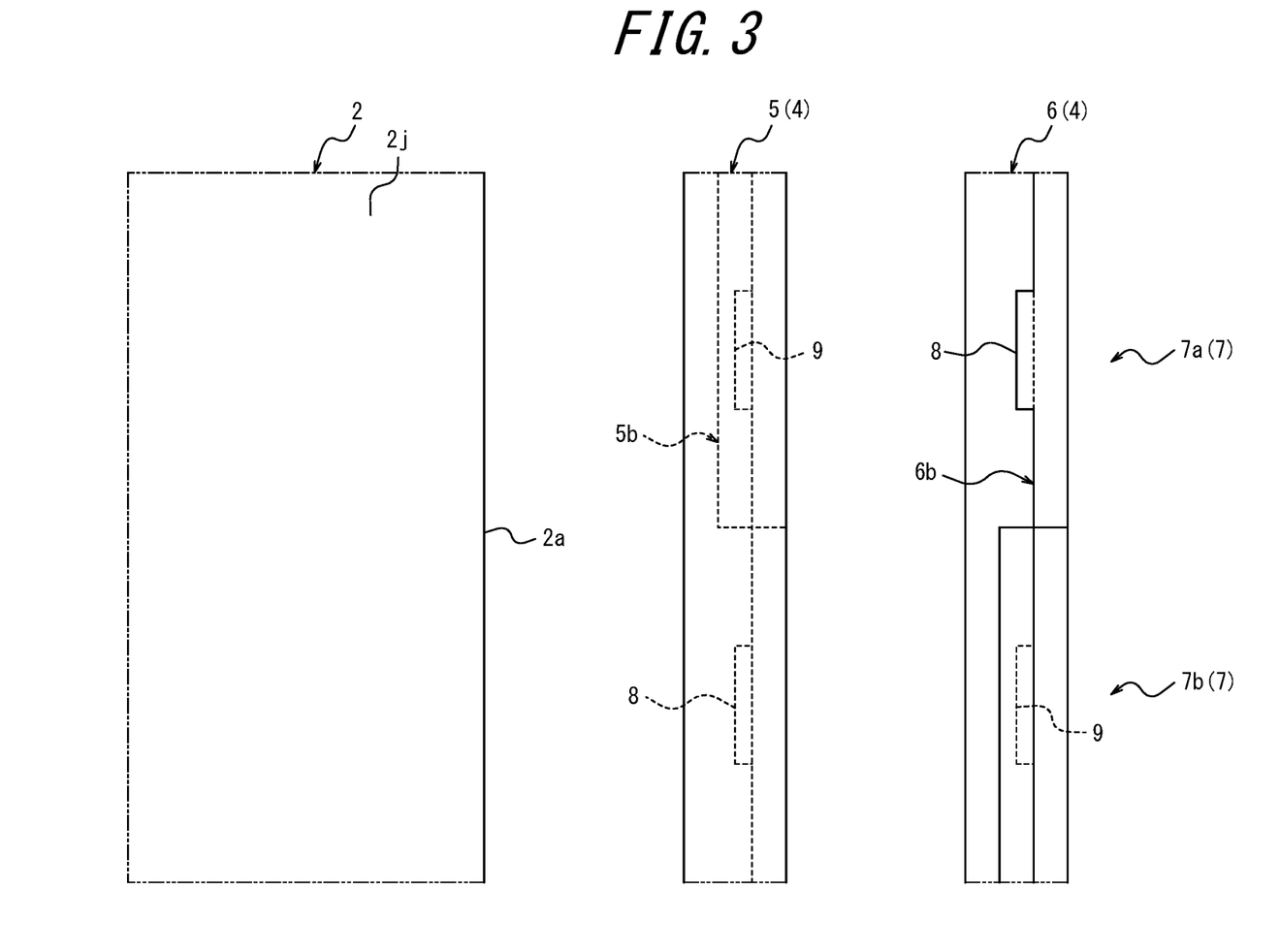
FIG. 3 is a plan view illustrating an alternating arrangement structure of the energy harvesting module illustrated in FIG. 1 in a pre-assembly state.
Figure 4:
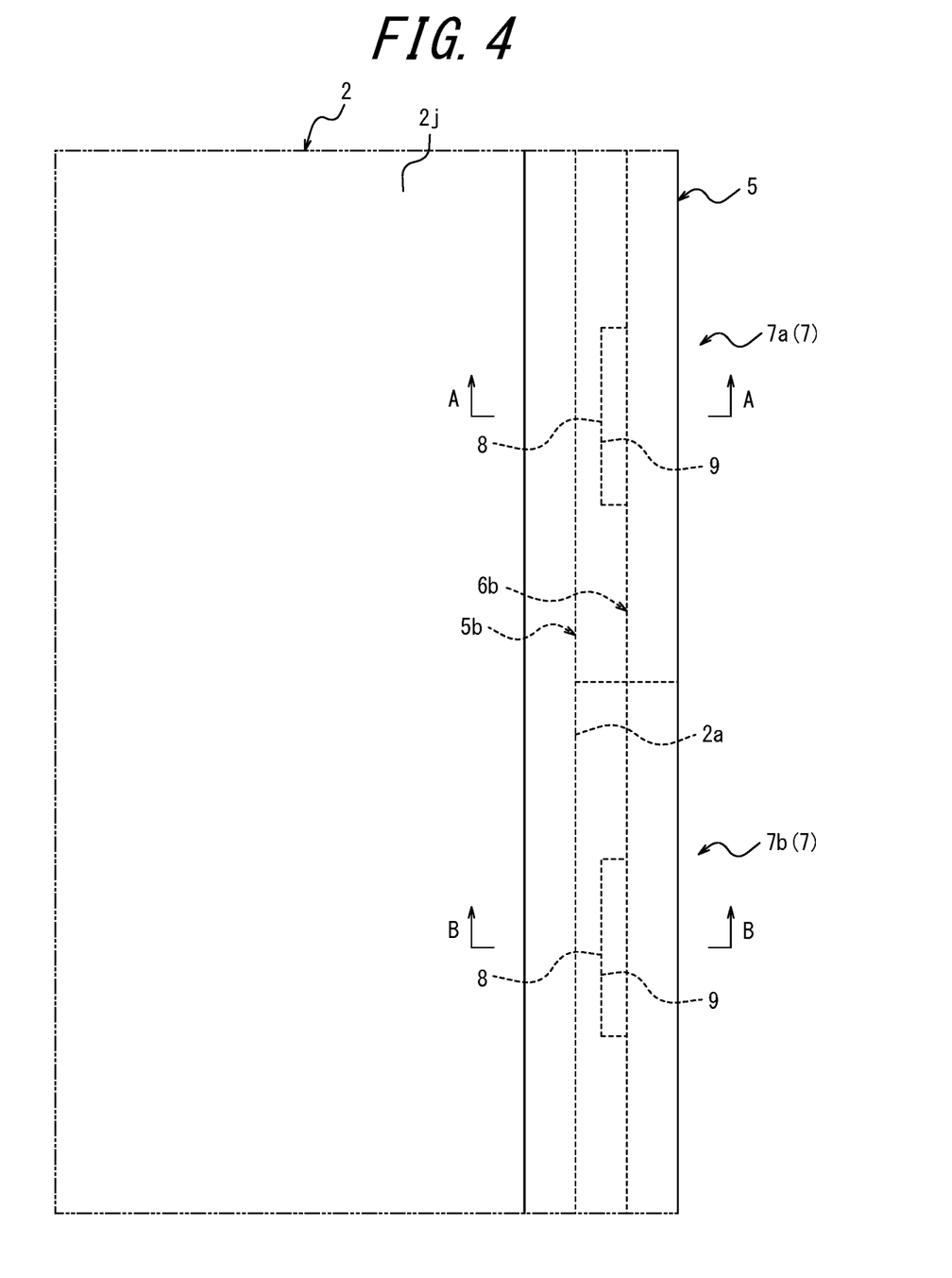
FIG. 4 is a plan view illustrating the alternating arrangement structure of the energy harvesting module illustrated in FIG. 1 in a post-assembly state.

At the first side 2a, the frame 4 has an alternating arrangement structure 7 in which, along the outer edge of the energy harvesting element 2, there is alternating arrangement of: an outward second perimeter wall structure 7a configured such that the second perimeter wall 6b overlaps with the first perimeter wall 5b from an outward radial direction and snap-fits therewith in an up/down direction; and an inward second perimeter wall structure 7b configured such that the second perimeter wall 6b overlaps with the first perimeter wall 5b from an inward radial direction and snap-fits therewith in an up/down direction. It should be noted that although only one outward second perimeter wall structure 7a and one inward second perimeter wall structure 7b are illustrated in FIGS. 3 and 4, the number of outward second perimeter wall structures 7a and the number of inward second perimeter wall structures 7b that are included in the alternating arrangement structure 7 can be set as appropriate.

At the first side 2a, a portion of the first perimeter wall 5b that forms the outward second perimeter wall structure 7a and a portion of the second perimeter wall 6b that forms the inward second perimeter wall structure 7b are aligned in a perimeter direction, and a portion of the second perimeter wall 6b that forms the outward second perimeter wall structure 7a and a portion of the first perimeter wall 5b that forms the inward second perimeter wall structure 7b are aligned in a perimeter direction.

Note that although the second perimeter wall 6b includes a protrusion 8 as a step shaped portion and the first perimeter wall 5b includes a recess 9 as a step shaped portion in the outward second perimeter wall structure 7a, a configuration in which the protrusion 8 and the recess 9 are switched may be adopted. In other words, the second perimeter wall 6b may include a recess 9 as a step shaped portion and the first perimeter wall 5b may include a protrusion 8 as a step shaped portion.

Moreover, although the second perimeter wall 6b includes a recess 9 as a step shaped portion and the first perimeter wall 5b includes a protrusion 8 as a step shaped portion in the inward second perimeter wall structure 7b, a configuration in which the recess 9 and the protrusion 8 are switched may be adopted. In other words, the second perimeter wall 6b may include a protrusion 8 as a step shaped portion and the first perimeter wall 5b may include a recess 9 as a step shaped portion.

Figure 5:
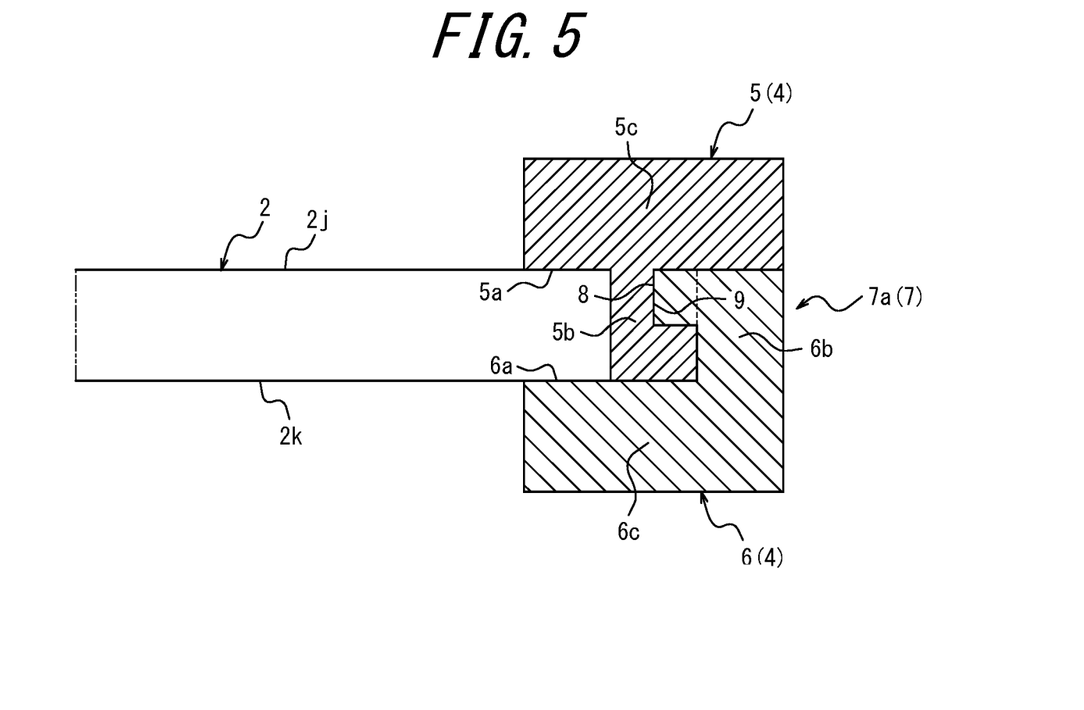
FIG. 5 is a cross-sectional view at A-A in FIG. 4.
Figure 6:
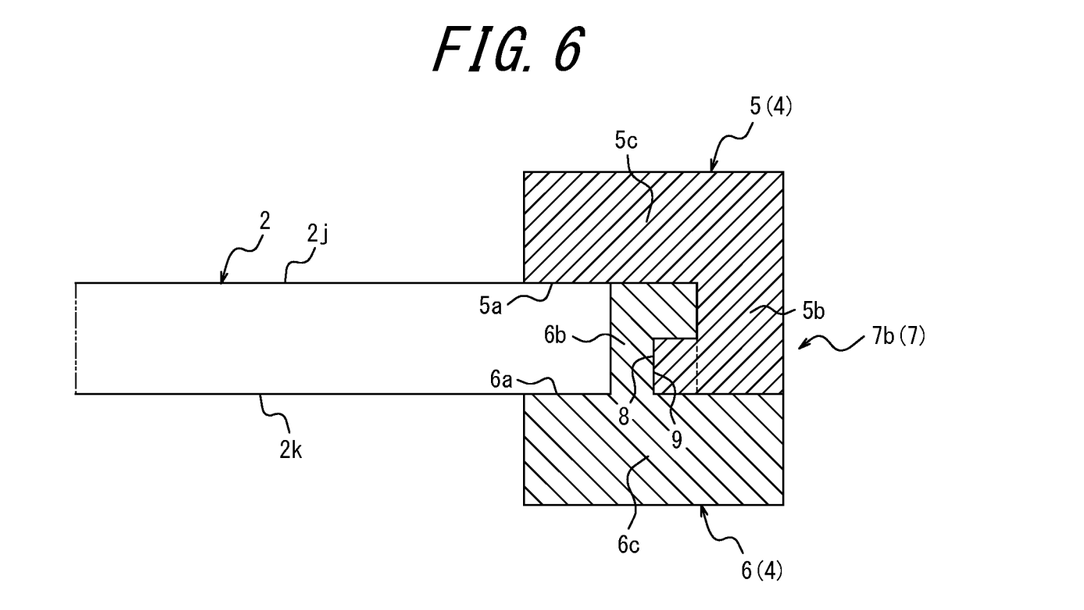
FIG. 6 is a cross-sectional view at B-B in FIG. 4.

A configuration in which an outer surface of the first perimeter wall 5b and an inner surface of the second perimeter wall 6b are in contact with each other in the outward second perimeter wall structure 7a is preferable in terms of ensuring fitting strength. Moreover, a configuration in which an inner surface of the first perimeter wall 5b and an outer surface of the second perimeter wall 6b are in contact with each other in the inward second perimeter wall structure 7b is preferable in terms of ensuring fitting strength.

Note that in each of the outward second perimeter wall structure 7a and the inward second perimeter wall structure 7b, a gap may or may not be present between a lower surface of the first perimeter wall 5b and an upper surface of the second principal wall 6c, and a gap may or may not be present between an upper surface of the second perimeter wall 6b and a lower surface of the first principal wall 5c. In the outward second perimeter wall structure 7a, an outer surface of the first principal wall 5c and an outer surface of the second perimeter wall 6b may or may not be flush. In the inward second perimeter wall structure 7b, an outer surface of the second principal wall 6c and an outer surface of the first perimeter wall 5b may or may not be flush.

Moreover, in the outward second perimeter wall structure 7a, a configuration may be adopted in which the first principal wall 5c is not present upward of the second perimeter wall 6b and in which the second perimeter wall 6b extends upward such that an upper surface of the second perimeter wall 6b and an upper surface of the first principal wall 5c are flush. In the inward second perimeter wall structure 7b, a configuration may be adopted in which the second principal wall 6c is not present downward of the first perimeter wall 5b and in which the first perimeter wall 5b extends downward such that a lower surface of the first perimeter wall 5b and a lower surface of the second principal wall 6c are flush.

In order to facilitate snap-fitting in the outward second perimeter wall structure 7a, a configuration in which a corner between an upper surface and a leading surface of the protrusion 8 is chamfered or a configuration in which a corner between a lower surface and an outer surface of the first perimeter wall 5b is chamfered may be adopted. Moreover, in order to facilitate snap-fitting in the inward second perimeter wall structure 7b, a configuration in which a corner between a lower surface and a leading surface of the protrusion 8 is chamfered or a configuration in which a corner between an upper surface and an outer surface of the second perimeter wall 6b is chamfered may be adopted.

The frame 4 has the alternating arrangement structure 7 that includes the above-described configuration not only at the first side 2a, but also at each of the second side 2b, the third side 2c, and the fourth side 2d. Moreover, the first support surface 5a of the first partial frame 5 is configured to support the outer edge of the first principal surface 2j not only at the first side 2a, but also at each of the second side 2b, the third side 2c, and the fourth side 2d. Furthermore, the second support surface 6a of the second partial frame 6 is configured to support the outer edge of the second principal surface 2k not only at the first side 2a, but also at each of the second side 2b, the third side 2c, and the fourth side 2d.

The energy harvesting module 1 of the present embodiment can easily be produced through a frame attachment step in which the first partial frame 5 and the second partial frame 6 are attached to the outer edge of the energy harvesting element 2 by snap-fitting the first perimeter wall 5b and the second perimeter wall 6b with each other in an up/down direction in the alternating arrangement structure 7.

Moreover, it is possible to ensure good fitting strength of the first partial frame 5 and the second partial frame 6 at the first side 2a as a result of elastic deformation of the first partial frame 5 in an outward radial direction relative to the second partial frame 6 being inhibited by the outward second perimeter wall structure 7a and elastic deformation of the first partial frame 5 in an inward radial direction relative to the second partial frame 6 being inhibited by the inward second perimeter wall structure 7b at the first side 2a.

Furthermore, in the energy harvesting module 1 of the present embodiment, good fitting strength of the first partial frame 5 and the second partial frame 6 can be ensured through the alternating arrangement structure 7 at the second side 2b, the third side 2c, and the fourth side 2d in the same manner as at the first side 2a, and thus the energy harvesting element 2 can be strongly supported by the frame 4.

The embodiment described above is merely one example of an embodiment of the present disclosure, and various alterations can be made that do not deviate from the essence of the present disclosure.

Accordingly, various alterations such as described below, for example, can be made in the energy harvesting module 1 and production method thereof according to the embodiment described above.

Various alterations can be made to the energy harvesting module 1 so long as the energy harvesting module 1 includes: an energy harvesting element 2 that is plate shaped and includes a first principal surface 2j, a second principal surface 2k located at a rear side of the first principal surface 2j, and a first side 2a forming corners (first corner 2e and second corner 2f) at both ends thereof; and a frame 4 that includes a first partial frame 5 configured to support an outer edge of the first principal surface 2j and a second partial frame 6 configured to support an outer edge of the second principal surface 2k, wherein the first partial frame 5 includes a first perimeter wall 5b that extends along an outer edge of the energy harvesting element 2 and also extends from a side corresponding to the first principal surface 2j toward a side corresponding to the second principal surface 2k, the second partial frame 6 includes a second perimeter wall 6b configured to overlap with the first perimeter wall 5b in a radial direction, and, at the first side 2a, the frame 4 has an alternating arrangement structure 7 in which, along the outer edge of the energy harvesting element 2, there is alternating arrangement of: an outward second perimeter wall structure 7a configured such that the second perimeter wall 6b overlaps with the first perimeter wall 5b from an outward radial direction and snap-fits therewith; and an inward second perimeter wall structure 7b configured such that the second perimeter wall 6b overlaps with the first perimeter wall 5b from an inward radial direction and snap-fits therewith.

However, it is preferable that in the energy harvesting module 1, the first partial frame 5 is configured to support the outer edge of the first principal surface 2j at the first side 2a and the second partial frame 6 is configured to support the outer edge of the second principal surface 2k at the first side 2a.

Moreover, in the energy harvesting module 1, it is preferable that the first partial frame 5 and the second partial frame 6 are configured to act in conjunction to sandwich the energy harvesting element 2 at the first side 2a.

Furthermore, in the energy harvesting module 1, it is preferable that the energy harvesting element 2 includes a second side 2b and a third side 2c that are located adjacently to the first side 2a and a fourth side 2d that is located opposite the first side 2a, and has a rectangular plate shape, and that the frame 4 has the alternating arrangement structure 7 at each of the second side 2b, the third side 2c, and the fourth side 2d.

Various alterations can be made to the method of producing the energy harvesting module 1 so long as the energy harvesting module 1 includes: an energy harvesting element 2 that is plate shaped and includes a first principal surface 2j, a second principal surface 2k located at a rear side of the first principal surface 2j, and a first side 2a forming corners (first corner 2e and second corner 2f) at both ends thereof; and a frame 4 that includes a first partial frame 5 configured to support an outer edge of the first principal surface 2j and a second partial frame 6 configured to support an outer edge of the second principal surface 2k, wherein the first partial frame 5 includes a first perimeter wall 5b that extends along an outer edge of the energy harvesting element 2 and also extends from a side corresponding to the first principal surface 2j toward a side corresponding to the second principal surface 2k, the second partial frame 6 includes a second perimeter wall 6b configured to overlap with the first perimeter wall 5b in a radial direction, and, at the first side 2a, the frame 4 has an alternating arrangement structure 7 in which, along the outer edge of the energy harvesting element 2, there is alternating arrangement of: an outward second perimeter wall structure 7a configured such that the second perimeter wall 6b overlaps with the first perimeter wall 5b from an outward radial direction and snap-fits therewith; and an inward second perimeter wall structure 7b configured such that the second perimeter wall 6b overlaps with the first perimeter wall 5b from an inward radial direction and snap-fits therewith, and so long as the method includes a frame attachment step of attaching the first partial frame 5 and the second partial frame 6 to the outer edge of the energy harvesting element 2 by snap-fitting the first perimeter wall 5b and the second perimeter wall 6b with each other in the alternating arrangement structure 7.

INDUSTRIAL APPLICABILITY

According to the present disclosure, it is possible to provide an energy harvesting module and method of producing the same that enable production process simplification.

REFERENCE SIGNS LIST 1 energy harvesting module
2 energy harvesting element
2a first side
2b second side
2c third side
2d fourth side
2e first corner
2f second corner
2g third corner
2h fourth corner
2i terminal protrusion
2j first principal surface
2k second principal surface
3 terminal member
4 frame
5 first partial frame
5a first support surface
5b first perimeter wall
5c first principal wall
6 second partial frame
6a second support surface
6b second perimeter wall
6c second principal wall
7 alternating arrangement structure
7a outward second perimeter wall structure
7b inward second perimeter wall structure
8 protrusion
9 recess

The invention claimed is:

1. An energy harvesting module comprising:
an energy harvesting element that is plate shaped and includes a first principal surface, a second principal surface located at a rear side of the first principal surface, and a first side forming corners at both ends thereof; and
a frame that includes a first partial frame configured to support an outer edge of the first principal surface and a second partial frame configured to support an outer edge of the second principal surface, wherein
the first partial frame includes a first perimeter wall that extends along an outer edge of the energy harvesting element and also extends from a side corresponding to the first principal surface toward a side corresponding to the second principal surface,
the second partial frame includes a second perimeter wall configured to overlap with the first perimeter wall in a radial direction, and
at the first side, the frame has an alternating arrangement structure in which, along the outer edge of the energy harvesting element, there is alternating arrangement of: an outward second perimeter wall structure configured such that the second perimeter wall overlaps with the first perimeter wall from an outward radial direction and is snap-fitted therewith; and an inward second perimeter wall structure configured such that the second perimeter wall overlaps with the first perimeter wall from an inward radial direction and is snap-fitted therewith.

2. The energy harvesting module according to claim 1, wherein
the first partial frame is configured to support the outer edge of the first principal surface at the first side, and
the second partial frame is configured to support the outer edge of the second principal surface at the first side.

3. The energy harvesting module according to claim 1, wherein the first partial frame and the second partial frame are configured to act in conjunction to sandwich the energy harvesting element at the first side.

4. The energy harvesting module according to claim 1, wherein
the energy harvesting element includes a second side and a third side that are located adjacently to the first side and a fourth side that is located opposite the first side, and has a rectangular plate shape, and
the frame has the alternating arrangement structure at each of the second side, the third side, and the fourth side.

5. A method of producing an energy harvesting module in which the energy harvesting module includes:
an energy harvesting element that is plate shaped and includes a first principal surface, a second principal surface located at a rear side of the first principal surface, and a first side forming corners at both ends thereof; and
a frame that includes a first partial frame configured to support an outer edge of the first principal surface and a second partial frame configured to support an outer edge of the second principal surface, wherein
the first partial frame includes a first perimeter wall that extends along an outer edge of the energy harvesting element and also extends from a side corresponding to the first principal surface toward a side corresponding to the second principal surface,
the second partial frame includes a second perimeter wall configured to overlap with the first perimeter wall in a radial direction, and
at the first side, the frame has an alternating arrangement structure in which, along the outer edge of the energy harvesting element, there is alternating arrangement of: an outward second perimeter wall structure configured such that the second perimeter wall overlaps with the first perimeter wall from an outward radial direction and is snap-fitted therewith; and an inward second perimeter wall structure configured such that the second perimeter wall overlaps with the first perimeter wall from an inward radial direction and is snap-fitted therewith,
the method comprising:
a frame attachment step of attaching the first partial frame and the second partial frame to the outer edge of the energy harvesting element by snap-fitting the first perimeter wall and the second perimeter wall with each other in the alternating arrangement structure.

* * * * *